United States Patent
Bhatia

(10) Patent No.: US 9,984,386 B1
(45) Date of Patent: May 29, 2018

(54) RULES RECOMMENDATION BASED ON CUSTOMER FEEDBACK

(71) Applicant: Amazon Technologies, Inc., Seattle, WA (US)

(72) Inventor: Sandeep Bhatia, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 14/709,227

(22) Filed: May 11, 2015

(51) Int. Cl.
G06Q 30/00 (2012.01)
G06Q 30/02 (2012.01)

(52) U.S. Cl.
CPC .............................. G06Q 30/0241 (2013.01)

(58) Field of Classification Search
CPC ................................................. G06Q 30/0241
USPC ...................................................... 705/14.43
See application file for complete search history.

(56) References Cited

U.S. PATENT DOCUMENTS

| 2008/0010148 A1* | 1/2008 | Knibiehly | G06Q 30/00 705/14.23 |
| 2013/0144605 A1* | 6/2013 | Brager | G06F 17/28 704/9 |

FOREIGN PATENT DOCUMENTS

WO    WO -2007129246 A1 * 11/2007 ....... G06F 17/30843

OTHER PUBLICATIONS

Rajshekhar Sunderraman (Jun. 2006) Fundamentals of Database Systems Laboratory Manual. Retrived online Dec. 23, 2017.*

* cited by examiner

*Primary Examiner* — James A Reagan
(74) *Attorney, Agent, or Firm* — Kilpatrick Townsend & Stockton LLP

(57) ABSTRACT

Methods and systems for managing or regulating offer listings in an electronic marketplace. Consumer feedback regarding the offer listings may be received and analyzed to generate recommended or candidate rules. The recommended rules may be presented to rule authors for validation. Acceptance and/or rejection of the recommended rules can be used to train or otherwise improve the generation of future recommended rules. The accepted recommended rules can be used to generate final rules. The final rules may be applied to offer listings to trigger a variety of actions including filtering of offer listings, sending notifications to sellers, and updating offer listings user interface.

20 Claims, 10 Drawing Sheets

RULES RECOMMENDATION BASED ON CUSTOMER FEEDBACK

BACKGROUND

Modern electronic marketplaces allow consumers to search and purchase a variety of items online. To facilitate informed decisions by consumers with respect to a particular item, a list of offers for the item from different sellers may be collected and provided to consumers for comparison purposes. Often times, offers may include erroneous, fraudulent, or otherwise undesirable information. For example, a seller may unintentionally put in an offer with a mistake in the price or description of the item. As another example, a seller may provide a deceptive lowball offer in order to get to the top of the offer list. Such anomalies may negatively affect a consumer's experience and hurt the bottom line.

BRIEF DESCRIPTION OF THE DRAWINGS

Various embodiments in accordance with the present disclosure will be described with reference to the drawings, in which.

DETAILED DESCRIPTION

Figure 1:
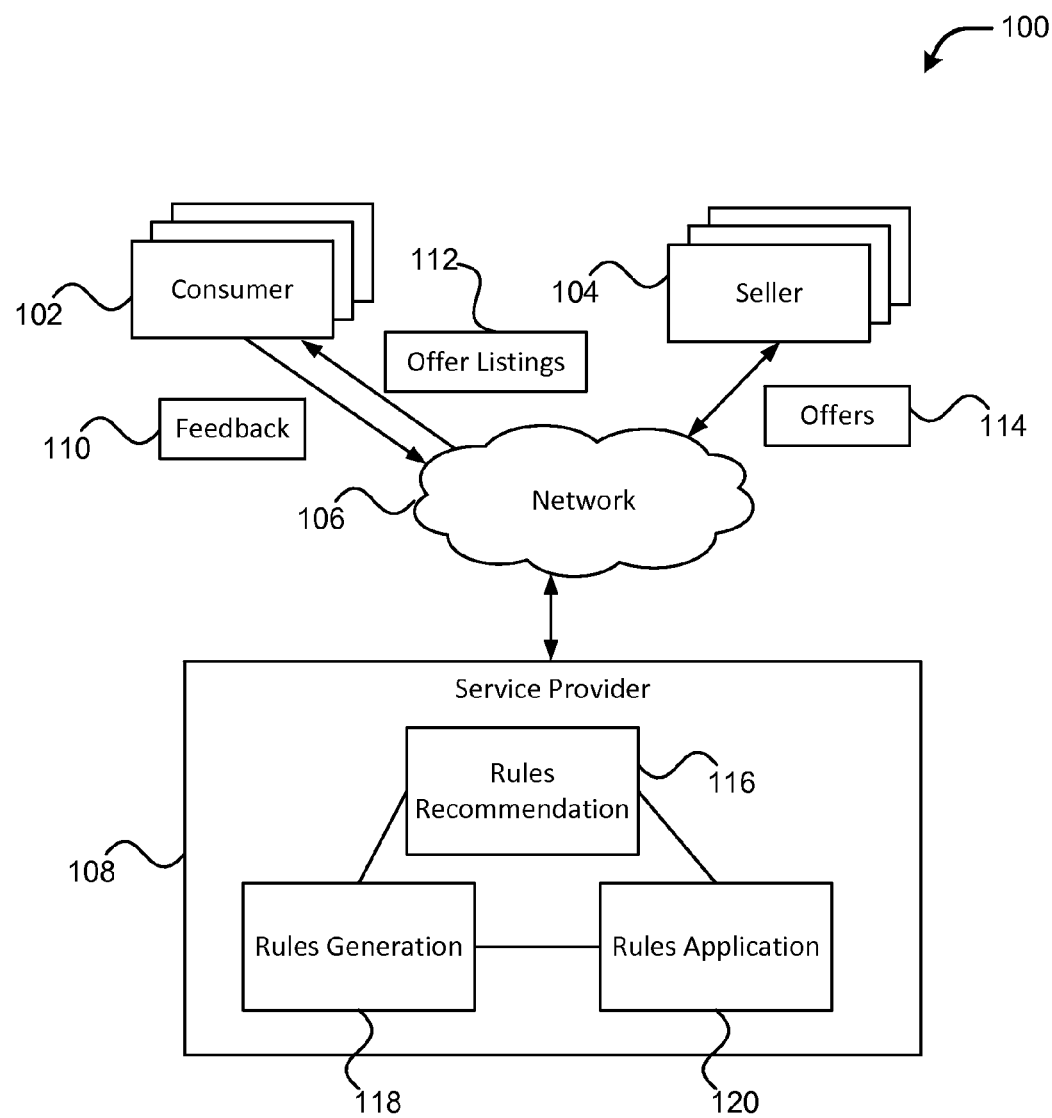
FIG. 1 illustrates an exemplary computing environment, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include methods and systems for managing or regulating offer listings in an electronic marketplace. In particular, computer-based analysis of the consumer feedback may be performed to extract entities and entity relations based on domain-specific information (e.g., domain ontologies) and/or context information associated with the feedback. Based on the analysis of the feedback, recommended or candidate rules to regulate or manage the offer listings may be generated. The recommended rules may be provided to system administrators, so that they may accept or reject the recommended rules. The acceptance and/or rejection of the recommended rules can be used to train or otherwise improve the generation of future recommended rules. The accepted recommended rules can be used to generate final rules. The final rules may be applied to offer listings to trigger a variety of actions including filtering of offer listings, sending notifications to sellers, updating offer listings user interface, and the like.

Because the recommended rules are generated in response to consumer feedback, the recommended rules may be more likely to track current or recent issues or problems associated with the offer listings. Automated rules generation can significantly ease a task of manual rules update by rule authors. Such a task may be difficult, if not impossible, given an increasing speed and volume of data exchange and update at the electronic marketplace. Validation of the recommended rules (e.g., by a rule author) not only provides quality control but also can help to train and/or guide the generation of future recommended rules.

Consider an example where Alice, a potential buyer, notices that a list of offers for a book that includes an offer with an unusually high price. She may submit feedback via a link stating "is the book really $1000? The price seems crazy given that most others are asking for at most $40." Based on Alice's feedback, a recommended rule may be generated that that filters out offers for the book (or other books) with a price that is equal to or greater than $1000. The recommended rule may be presented to a system administrator (e.g., a rule author) via a user interface. The rule author may validate (accept) or invalidate (reject) the recommended rule. Once validated (accepted), the recommended rule may be applied to filter offer listings based on the offer price.

An electronic marketplace, provided by a service provider, can allow consumers (e.g., buyers) to search and purchase items from providers (e.g., sellers) of items. Items can include tangible items such as products and intangible items such as services. An item can be associated with a plurality of item attributes. The item attributes may include product or service information such as category (e.g., electronics, books, clothing, toys, or automobiles), product name, description, dimensions, model, identifiers (e.g., Stock Keeping Unit (SKU) code, Universal Product Code (UPC), Quick Response (QR) code, International Article Number (EAN), Global Trade Item Number (GTIN), International Standard Book Number), manufacturer, warranty information, technical features, audio or video files associated with the item, and the like. The item attributes may be related to customers such as customer reviews, customer ratings, customer-provided photos or videos, and the like. The item attributes may also be related to sellers such as seller reviews, seller descriptions, seller-provided photos or videos, consumer membership associated with a seller, and the like. The item attributes may also be specific to the electronic marketplace such as rankings (e.g., best seller ranking), category or department within the marketplace, marketplace-specific identifiers (e.g., Amazon Standard Identification Number (ASIN)), and the like. In accordance with some embodiments, the set of item attributes associated with an item may vary depending on a type or category, or other characteristics of the item. For instance, a book may have a different set of item attributes (e.g., publisher, ISBN, number of pages) than an electronic device (e.g., model number, technical features, warranty information). As another example, a product may have a different set of item attributes than a service. In some cases, different types of items may share common item attributes such as product names, dimensions, weight, and the like. In some other cases, different types of items may not share common item attributes.

An offer listings user interface can be provided for presenting a plurality of offers to sell an item from a plurality of sellers to consumers so that consumers can compare the offers. An offer may represent a listing of an item available for ordering from the electronic marketplace. In some cases, the offers may be submitted by the sellers via an offer providers user interface provided by the electronic marketplace. An offer may be associated with one or more offer attributes. The offer attributes may include pricing and/or shipping information (e.g., price, tax, shipping cost, and/or handling cost), item-related information (e.g., condition), seller-related information (including seller name, address, seller rating, consumer reviews, qualifications, other products sold by the seller, shipping policies, return policies, and/or privacy policies, buying options), and the like. The offers may be presented in the offer listings user interface according to one or more attributes such as item attributes and/or offer attributes. For instance, the offers may be ranked, sorted, or otherwise arranged according to price, price plus shipping, condition, seller rating, and/or other attributes or combinations of attributes. An exemplary offer listings user interface is provided in FIG. 4.

The offer listings user interface can be configured to allow users of the electronic marketplace to submit feedback. Users of the electronic marketplace may include consumers as well as sellers. Feedback can include any user-provided information that reflects the user's reaction, evaluation, or review related to any aspect of the electronic marketplace. For instance, feedback may be provided regarding an offer listed in the offer listings user interface, an item that is listed in an item catalog, a buying experience, a refund and/or cancellation policy, a seller and/or buyer of a product or service, features of the electronic marketplace, and the like. As an example, a buyer may submit feedback indicating that a listing price of an offer appears unusual (e.g., too low or too high) compared with other offer listings for the same item.

Feedback can include the actual feedback content in text, audio, video, or any other suitable format. Feedback can be associated with context information. Context information may include information about a contributor of the feedback (e.g., user identifier, user name, email address, mailing address, phone number). Context information can also include information about one or more objects or entities involved in or associated with the feedback such as one or more items, item attributes, sellers, buyers, offers, offer attributes, marketplace features, network documents, and the like. Context information may also include timing information (e.g., creation time for the feedback), location information, and/or any other suitable information that provides a context for the feedback.

Feedback can include one or more feedback attributes for storing information for feedback (e.g., feedback content and context information). Some or all of the feedback attributes (e.g., feedback content) may be provided by a contributor of the feedback. Alternatively or additionally, some of the feedback attributes may be automatically provided or populated when the feedback is created and/or saved. For instance, user identification information and/or some of the context information associated with the feedback (e.g., link to underlying feedback objects or network documents therefor) may be user-provided and/or system-generated. In an example, feedback attributes can include a reference to a network resource or document (e.g., a Universal Resource Locator (URL) or identifier) for presenting the underlying object or objects associated with the feedback.

Feedback may be provided via feedback user interface. In some cases, the feedback user interface may be the same as or otherwise accessible from the offer listings user interface. In some other cases, the feedback user interface may be separate and distinct from the offer listings user interface. The feedback user interface can include a number of input user interface controls (e.g., text fields, text boxes, drop-down list, checkboxes) configured to allow users to enter or select information for the feedback attributes. For instance, the feedback user interface may include a form with text boxes or fields for entering feedback text, feedback contributor information (e.g., email address), and/or link information for offer listings, items, sellers, buyers, or any other objects involved in the feedback. An exemplary feedback user interface is provided in FIG. 5. Generally, feedback user interface can broadly cover any suitable interface or channel for providing feedback including email, text messaging, phone calls, fax, and the like.

Feedback provided by users may be used to automatically generate recommended rules. A recommended rule is a rule that is not enforced but provided as a candidate for a final rule. A final rule is a rule that is enforced (e.g., applied to regulate offer listings). Final rules may or may not be generated based on recommended rules. Final rules may be updated and/or replaced on a continuous or periodic basis, for example, based on user-configurable settings.

A rule (e.g., recommended rule or final rule) can include a rule condition and optionally one or more rule actions. A rule condition may include one or more criteria or logical tests based on attributes associated with the object to which the rule is applied. An example rule condition may be "product_identifier 'ABC' & price >900'", where "product_identifier" is the product identifier attribute associated with an offer and "price" is the price attribute of the offer. If a rule condition is satisfied (e.g., the logical tests evaluate to be true), then the associated rule action may be invoked. A rule action may include updating attributes of the object on which the rule is applied. For instance, in the above example, if an offer has a product id of 'ABC' and price greater than $900, then a suppression attribute of the offer may be updated (e.g., changing from '0' to '1') so as to cause render the offer invisible in the offer listings user interface.

A rule can also include a rule context which the rule is applicable. A rule context can include, for example, one or more items (e.g., as identified by their identifiers or ASINs), categories (e.g., electronics, books), sellers, and the like. A rule context may be used to selectively apply a rule. For example, where a rule context specifies one or more item identifiers, the rule may only be applied to only offer listings associated with those one or more items identified by the item identifiers, and not to offer listings associated with other items. As another example, where a rule context specifies one or more categories, the rule may be applied to only offer listings associated with those one or more categories, and not to offer listings associated with other categories.

A rule action can also include sending a notification to a seller associated with the offer for which the rule action is triggered. For example, a consumer may submit feedback with a price inquiry for a particular offer (e.g., "The listing price is $10, will you reduce the price to $8 if I buy ten of these?"). A rule may be generated based on this feedback, such that when the rule condition is satisfied for an offer (e.g., the offer id of the offer on which the rule is applied is equal to the offer id of the offer associated with the feedback), a notification (e.g., email, text message, instant message, telephone call, fax) containing the consumer feedback (and maybe additional information) is provided to the seller associated with the offer.

A rule action can also include updating one or more user interface elements. For example, a consumer may submit feedback questioning the condition of an item associated with a particular offer (e.g., "The condition is listed as Used-Good but the screen is cracked"). A rule may be generated based on this feedback, such that when the rule condition is satisfied for an offer (e.g., the offer id of the offer on which the rule is applied is equal to the offer id of the offer associated with the feedback), a condition reliability indicator may be rendered with the offer in the offer listings user interface indicating that the displayed condition is questionable. As another example, a seller rating indicator or seller reliability indicator may be displayed and/or updated to reflect as part of the rule action. In various embodiments, the user interface element that is updated by a rule action can be associated with a user interface presented to a buyer and/or a seller. For instance, an offer attribute may be updated that is associated with an offer displayed in a buyer-facing offer listings user interface. As another example, an offer attribute may be updated that is associated with an offer displayed in a seller-facing offer providers user interface. In yet another example, a user interface element may be updated that is in a user interface accessible by both a buyer and a seller.

Recommended rules can be generated based on a user-provided feedback. Textual analysis of the feedback content can be performed to extract one or more entity names corresponding to one or more entities (e.g., item, item attribute, offer, offer attribute, seller, buyer, etc.) within the feedback content. The entity names may represent predefined categories such as names of persons, names of objects, organizations, locations, expressions of time, quantities, monetary values, percentages, and the like. Relations among the entities may be extracted and/or further filtered based at least in part on domain-specific information (e.g., domain ontologies) associated with the one or more entities and/or context information associated with the feedback. Entity relations or entity relationships can be used to express dependencies, requirements, mathematical relationships (e.g., greater than, less than, equals), or any other types of relationships between entities. The entity relations thus obtained can be used to generate recommended rules. For instance, a rule condition may be generated based on the entity relations. In some cases, a rule action is associated with the rule condition when a recommended rule is generated. In other cases, a rule action is not associated with a rule condition when the recommended rule is generated. Instead, a rule action may be associated with the rule condition later, for example, when final rule is generated (e.g., by a rule generation engine in response to a selection of rule action by a rule author or an automated selection process). In some cases, the rule action may be associated with the rule condition after the final rule is generated but before the final rule is applied (e.g., by a rule application engine). In accordance with some embodiments, two or more feedback can be used to create one recommended rule. For instance, entity relations extracted from the feedback can be correlated or otherwise combined to generate the one recommended rule. Details the generation of recommended rules are further discussed in FIG. 8.

A rule context can be associated with a recommended rule. As discussed above, the rule context may indicate the extent or scope to which the rule is applicable. A rule context can include, for example, one or more items (e.g., as identified by their identifiers or ASINs), categories (e.g., electronics, books), sellers, and the like. A rule context may be used to selectively apply a rule. In some embodiments, the rule context for a recommended rule may be determined based at least in part on the context associated with the feedback. Additionally or alternatively, the rule context may be determined based at least in part on textual analysis of the feedback.

Recommended rules generated based on the user-provided feedback may be used to generate final rules to be applied to offers. Final rules may include original recommended rules and/or derivations therefrom. For instance, a recommended rule may be selected to be used as a final rule. Alternatively, a recommended rule may be edited or modified to create a final rule. In accordance with some embodiments, a recommended rule may be missing certain information and the corresponding final rule fills in some of the missing information. For instance, a recommended rule may include only a rule condition but no rule action whereas the corresponding final rule may have a rule action associated with the rule condition. As another example, a recommended rule may be relatively weak in that the rule may include "holes" or placeholders in the rule expression whereas the corresponding final rule may be relatively strong with some or all of such placeholders are populated. For example, an exemplary weak rule may have a rule condition such as "product_id 'ABC' & price >'_'", where the '_' indicates that the value of the price is unspecified. In contrast, a relatively stronger rule may have a rule condition such as "product_id 'ABC' & price >'900'", where the value of the price is specified. In various embodiments, a final rule may be generated based on one, two, or more recommended rules. For instance, two or more recommended rules may be combined to create the final rule. In some cases, final rules may be generated that are not based on any recommended rules.

According to some embodiments, rules may be ranked based on how and/or when they are applicable and/or applied. For instance, the rules may be ranked based on the rule context (e.g., items, categories, sellers) in which the rules are applicable or applied. A rule that is applicable in one context (e.g., books) may also be applicable in another category (e.g., electronics). As another example, the rules may be ranked based on the time the rules are applied or will be applied. Based on the ranked list, rules de-duplication may be performed to remove duplicate rules. For instance, duplicate rules applicable for the same domain and/or scheduled to be applied around the same period of time may be de-duplicated such that only one rule is applied. In some embodiments, the de-duplication of rules may occur before the recommended rules are presented for selection. Accordingly, only rules that have not been rejected and/or applied may be presented for selection. In some embodiments, the rules may be de-duplicated, presented, selected, and/or applied for specific applicable contexts or domains. For instance, a first set of rules may be presented as applicable to a first domain (e.g., books) whereas a second set of rules may be presented as applicable to a second domain (e.g., electronics). A rule that has been removed from the first set of rules (e.g., because it has been rejected or applied) may nonetheless appear in the second set of rules because it may be determined to be valid for the second domain.

In various embodiments, selection of recommended rules and/or generation of the final rules may be performed by a human, by an automated process, or by a combination of both. For instance, a rules selection user interface may be provided to allow a system administrator, seller, or any other suitable entity to select some or all of recommended rules and/or to generate the final rules based on the selected recommended rules. The rules selection user interface may be configured to present the recommended rules to the user (e.g., in a list or other suitable format). The rules selection user interface may also include options for users to indicate whether to accept or reject the presented recommended rules. The rules selection user interface may also allow a user to generate a final rule based on one or more selected recommended rule, such as by editing an existing recommended rule, associating a rule action with a rule condition of a recommended rule, making the recommended rule stronger (e.g., by filling in placeholders in a weaker rule), combining two or more recommended rules, or the like. An exemplary rules selection user interface is provided in FIG. 6.

Alternatively or additionally, selection of recommended rules and/or generation of the final rules may be performed by an automated process. For example, relevant recommended rules may be selected based at least in part on statistical analysis and/or machine learning techniques. In an example, a recommended rule may be validated by applying the rule to a set of offers. A decrease in the offer count may indicate that the recommended rule is valid. On the other hand, if the offer count remains the same after application of the rule, then the rule is not applicable to any of the offers and hence may be determined to be invalid. In accordance with some embodiments, an unsupervised machine learning model may be used. In yet other embodiments, a hybrid of human-intervention and automation may be used, for example, using a supervised or semi-supervised machine learning model. For instance, a preliminary automated validation of the recommended rules may be performed based on offer count as discussed above. Rules determined valid during the preliminary validation may then be presented to a rule author for manual selection or validation. As another example, results of manual rules validation may be provided as input into an automated process (e.g., implementing a machine learning model) to train and/or guide the automated process (e.g., recommendation generation, final rule generation). Less human intervention may be required over time as the automated process develops and matures. For instance, when a recommended rule is accepted or selected by a rule author, such result can be used as a positive feedback to train a recommendation engine to value the accepted rule such that similar rules may be generated in the future. As another example, when a recommended rule is rejected by a rule author, such result can be used as a negative feedback to train a recommendation engine to devalue the rejected rule such that less or no similar rules are generated in the future. In some cases, the negative and/or positive feedback may be specific to certain domains or rule context associated with the rules. For instance, the acceptance and/or rejection of a rule based on item attributes may be used to train model behaviors with respect to rule generation associated with the specific domain or rule context (e.g., item, offers, category, seller) associated with the rule, but not with respect to the other domains. For instance, validation results for rules for a certain category of items (e.g., books) may be used to train rule generation for this specific category of times and not for other categories (e.g., electronics). For instance, a rule such as "hide offers with a price over $1000" that is associated with the books category may be independent from the same rule that is associated with the electronics category. Whether the first rule is applicable or applied to offers in the books category may have no bearing on whether the second rule is applicable to offers in the electronics category. In some other cases, the selection feedback in one domain may be used to train rules generation in another domain. For example, using the example above, the application of a rule in a rule context or domain (e.g., books category) have affect whether the same rule is applicable in a different rule context or domain (e.g., electronics category). An exemplary process for implementing rule selection and generation is further shown in FIG. 9.

According to some embodiments, at least some aspects of the rules selection, generation, and/or application process may be reversible. For instance, an applied rules view may be provided that shows rules that have been selected as valid and/or rules that have been applied. An administrator may be able to "unselect" the rules listed in the applied rules view such that the unselected rules are not selected as valid and/or not applied.

The final rules may be applied to offer listings or any other suitable data objects. In an embodiment, one or more final rules may be applied to each offer of a plurality of offers to determine whether the associated rule conditions are satisfied. If so, the associated rule action(s) may be triggered. Examples of rule actions can include updating attributes, sending communication messages (e.g., seller or buyer notifications), updating user interface elements, and the like.

While the techniques of the present disclosure are discussed in the context of offer listings at an electronic marketplace, it is understood that the same or similar techniques may be used to manage and/or regulate any other electronic data for which feedback data can be obtained. Such electronic data may include, for example, other listings at an electronic marketplace (e.g., item catalogs, reviews) or at a merchant's website, social media content (e.g., blogs, postings, tweets), data in online forums, and the like.

Various embodiments will now be discussed in greater detail with reference to the accompanying figures, beginning with FIG. 1.

FIG. 1 illustrates an exemplary computing environment 100, in accordance with embodiments. One or more consumers 102 and one or more sellers 104 may communicate with a service provider 108 via a network 106 to utilize services or functionalities provided by the service provider 108 such as those discussed herein.

In accordance with some embodiments, the service provider 108 may be configured to provide an electronic marketplace to facilitate transactions of items (e.g., goods and services) between consumers 102 and sellers 104. In particular, the service provider 108 may be configured to provide an offer management service. The offer management service can be used to for receiving offers 114 to sell items from sellers 104, presenting the offers as offer listings 112 to the consumers 102, and managing the offers based on consumer-provided feedback 110. The offer management service may be configured to generate recommended rules based on the consumer-provided feedback 110 (e.g., by a rules recommendation engine 116). The recommended rules can be used to generate final rules (e.g., by a rules generation engine 118) with or without human intervention. The final rules can be applied to the offer listings (e.g., by a rules application engine 120) in order to filter or remove fraudulent or undesirable offer listings or otherwise regulate and manage the offers listings. In accordance with some embodiments, the sellers 104 may also be allowed to provide input into the rules generation process.

Figure 2:
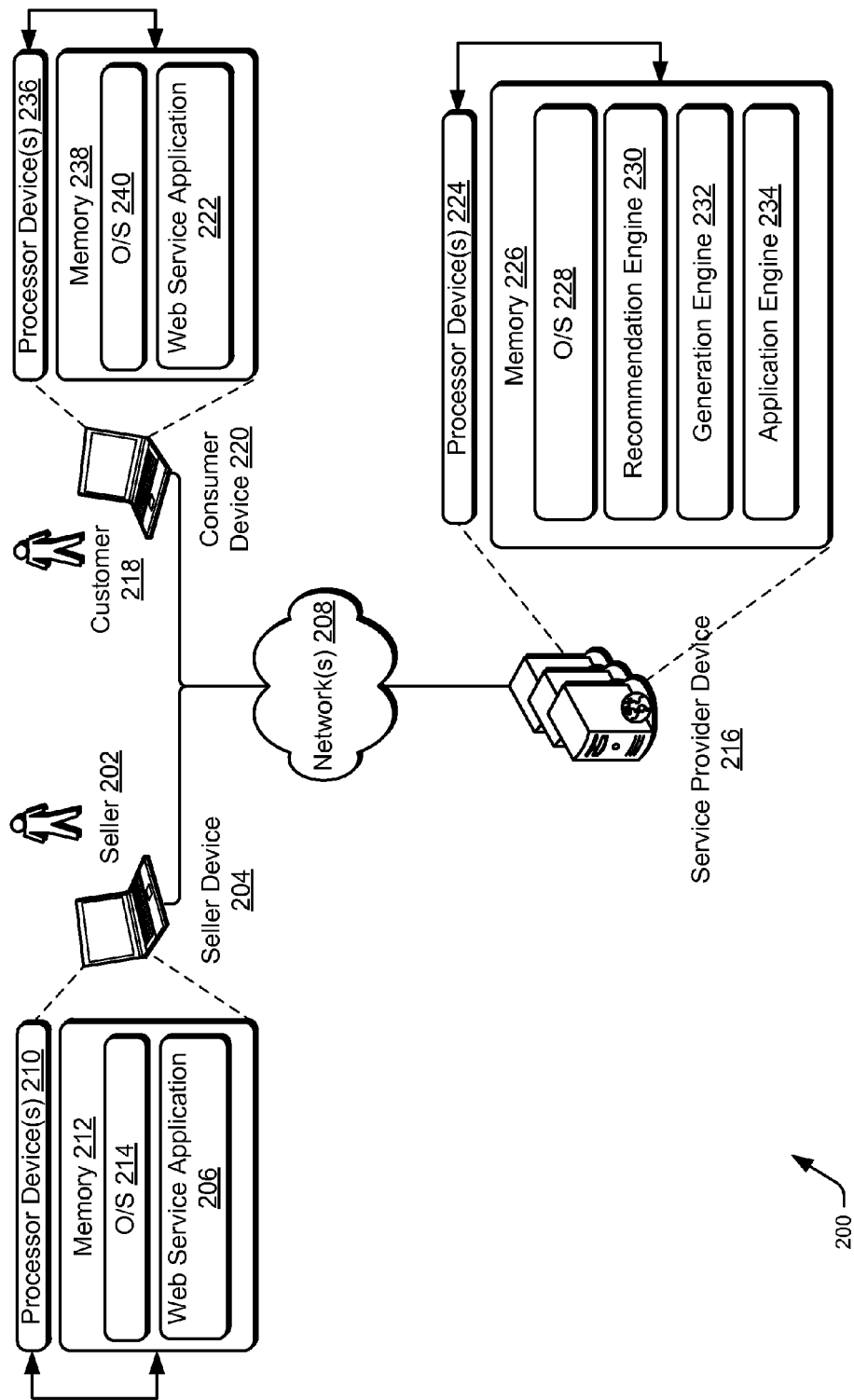
FIG. 2 illustrates an exemplary computing environment, in accordance with embodiments.

FIG. 2 illustrates an exemplary computing environment 200, in accordance with embodiments. The environment 200 may be similar to the environment 100 discussed above but with more details of the endpoint hardware devices.

In a basic configuration, a seller 202 may utilize a seller device 204 to access local applications, a web service application 206, a seller account accessible through the web service application 206, a web site or any other network-based resources via one or more networks 208. In some aspects, the web service application 206, the web site, and/or the seller account may be hosted, managed, and/or otherwise provided by one or more computing resources of the service provider, such as by utilizing one or more service provider devices 216. The seller 202 may use the local applications and/or the web service application 206 to interact with the network-based resources of the service provider. These transactions may include, for example, offering items for sale.

In some examples, the seller device 204 may be any type of computing devices such as, but not limited to, a mobile phone, a smart phone, a personal digital assistant (PDA), a laptop computer, a thin-client device, a tablet PC, etc. In one illustrative configuration, the seller device 204 may contain communications connection(s) that allow the seller device 204 to communicate with a stored database, another computing device or server, seller terminals, and/or other devices on the networks 208. The seller device 204 may also include input/output (I/O) device(s) and/or ports, such as for enabling connection with a keyboard, a mouse, a pen, a voice input device, a touch input device, a display, speakers, a printer, etc.

The seller device 204 may also include at least one or more processing units (or processor device(s)) 210 and one memory 212. The processor device(s) 210 may be implemented as appropriate in hardware, computer-executable instructions, firmware, or combinations thereof. Computer-executable instructions or firmware implementations of the processor device(s) 210 may include computer-executable or machine-executable instructions written in any suitable programming language to perform the various functions described.

The memory 212 may store program instructions that are loadable and executable on the processor device(s) 210, as well as data generated during the execution of these programs. Depending on the configuration and type of seller device 204, the memory 212 may be volatile (such as random access memory (RAM)) and/or non-volatile (such as read-only memory (ROM), flash memory, etc.). The seller device 204 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory may include an operating system (O/S) 214 and the one or more application programs or services for implementing the features disclosed herein including the web service application 206. In some examples, the seller device 204 may be in communication with the service provider devices 216 via the networks 208, or via other network connections. The networks 208 may include any one or a combination of many different types of networks, such as cable networks, the Internet, wireless networks, cellular networks, and other private and/or public networks. While the illustrated example represents the seller 202 accessing the web service application 206 over the networks 208, the described techniques may equally apply in instances where the seller 202 interacts with the service provider devices 216 via the seller device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 218 may utilize customer device 220 to access local applications, a web service application 222, a customer account accessible through the web service application 222, a web site, or any other network-based resources via the networks 208. In some aspects, the web service application 222, the web site, and/or the user account may be hosted, managed, and/or otherwise provided by the service provider devices 216 and may be similar to the web service application 206, the web site accessed by the computing device 204, and/or the seller account, respectively.

The customer 218 may use the local applications and/or the web service application 222 to conduct transactions with the network-based resources of the service provider. These transactions may include, for example, searching for items offered by the seller 202 at the network-based resources, receiving offers for the items, ordering items, submitting feedback, and other transactions.

In some examples, the customer device 220 may be configured similarly to the seller device 204 and may include at least one or more processing units (or processor device(s)) 236 and one memory 238. The processor device(s) 236 may be implemented as appropriate in hardware, computer-executable instructions, firmware, or combinations thereof similarly to the processor device(s) 210. Likewise, the memory 238 may also be configured similarly to the memory 212 and may store program instructions that are loadable and executable on the processor device(s) 236, as well as data generated during the execution of these programs. For example, the memory 238 may include an operating system (O/S) 240 and the one or more application programs or services for implementing the features disclosed herein including the web service application 222.

As described briefly above, the web service applications 206 and 222 may allow the seller 202 and customer 218, respectively, to interact with the service provider devices 216 to conduct transactions involving items. The service provider devices 216, perhaps arranged in a cluster of servers or as a server farm, may host the web service applications 206 and 222. These servers may be configured to host a web site (or combination of web sites) viewable via the computing devices 204 and 220. Other server architectures may also be used to host the web service applications 206 and 222. The web service applications 206 and 222 may be capable of handling requests from many sellers 202 and customers 218, respectively, and serving, in response, various interfaces that may be rendered at the computing devices 204 and 220 such as, but not limited to, a web site. The web service applications 206 and 222 may interact with any type of web site that supports interaction, including social networking sites, electronic retailers, informational sites, blog sites, search engine sites, news and entertainment sites, and so forth. As discussed above, the described techniques may similarly be implemented outside of the web service applications 206 and 222, such as with other applications running on the computing devices 204 and 220, respectively.

The service provider devices 216 may, in some examples, provide network-based resources such as, but not limited to, applications for purchase and/or download, web sites, web hosting, client entities, data storage, data access, management, virtualization, etc. The service provider devices 216 may also be operable to provide web hosting, computer application development, and/or implementation platforms, or combinations of the foregoing to the seller 202 and customer 218.

The service provider devices 216 may be any type of computing device such as, but not limited to, a mobile phone, a smart phone, a personal digital assistant (PDA), a laptop computer, a desktop computer, a server computer, a thin-client device, a tablet PC, etc. The service provider devices 216 may also contain communications connection(s) that allow service provider devices 216 to communicate with a stored database, other computing devices or servers, seller terminals, and/or other devices on the network 208. The service provider devices 216 may also include input/output (I/O) device(s) and/or ports, such as for enabling connection with a keyboard, a mouse, a pen, a voice input device, a touch input device, a display, speakers, a printer, etc.

Additionally, in accordance with some embodiments, the service provider devices 216 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 216 may be in communication with the computing devices 204 and 220 via the networks 208, or via other network connections. The service provider devices 216 may include one or more servers, perhaps arranged in a cluster, or as individual servers not associated with one another.

In one illustrative configuration, the service provider devices 216 may include at least one or more processing units (or processor devices(s)) 224 and one memory 226. The processor device(s) 224 may be implemented as appropriate in hardware, computer-executable instructions, firmware, or combinations thereof. Computer-executable instruction or firmware implementations of the processor device(s) 224 may include computer-executable or machine-executable instructions written in any suitable programming language to perform the various functions described.

The memory 226 may store program instructions that are loadable and executable on the processor device(s) 224, as well as data generated during the execution of these programs. Depending on the configuration and type of the service provider devices 216, the memory 226 may be volatile (such as random access memory (RAM)) and/or non-volatile (such as read-only memory (ROM), flash memory, etc.). The service provider devices 216 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 226 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 226 in more detail, the memory may include an operating system (O/S) 228, and code and data for implementing an offer management system or service including a rules recommendation engine 230, a rules generation engine 232, and a rules application engine 234. Although FIG. 2 illustrates the various data as stored in the memory 226, this data or portion of the data may be additionally or alternatively stored at a storage device remotely accessible to the service provider devices 216.

Figure 3:
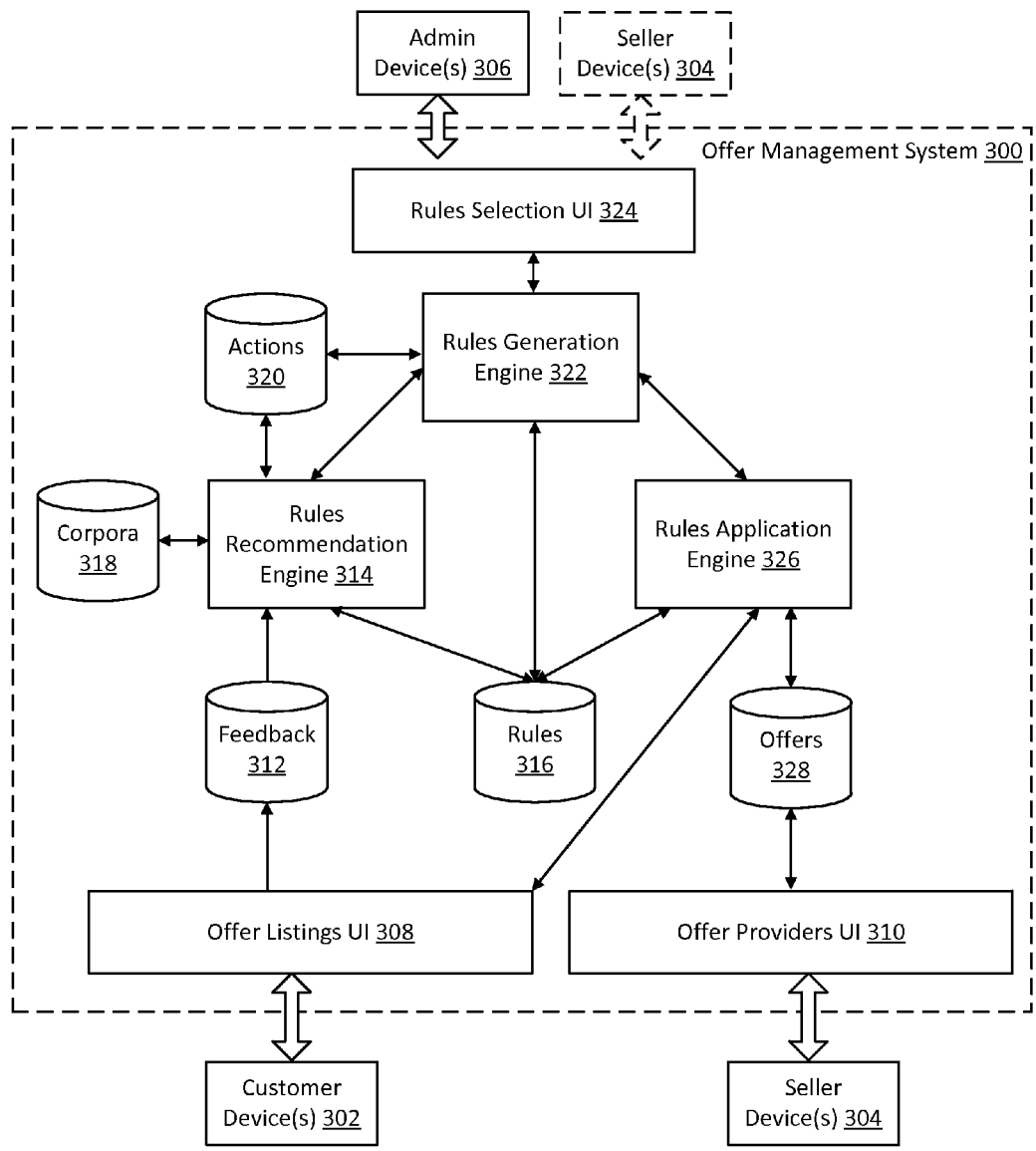
FIG. 3 illustrates exemplary components of an offer management system, in accordance with embodiments.

FIG. 3 illustrates exemplary components of an offer management system 300, in accordance with embodiments. Aspects of the offer management system 300 may be implemented by service provider devices discussed in FIGS. 1-2. As illustrated, the offer management system 300 can include a rules recommendation engine 314, a rules generation engine 322, a rules application engine 326, and other components that individually or collectively implement the methods described herein.

Figure 4:
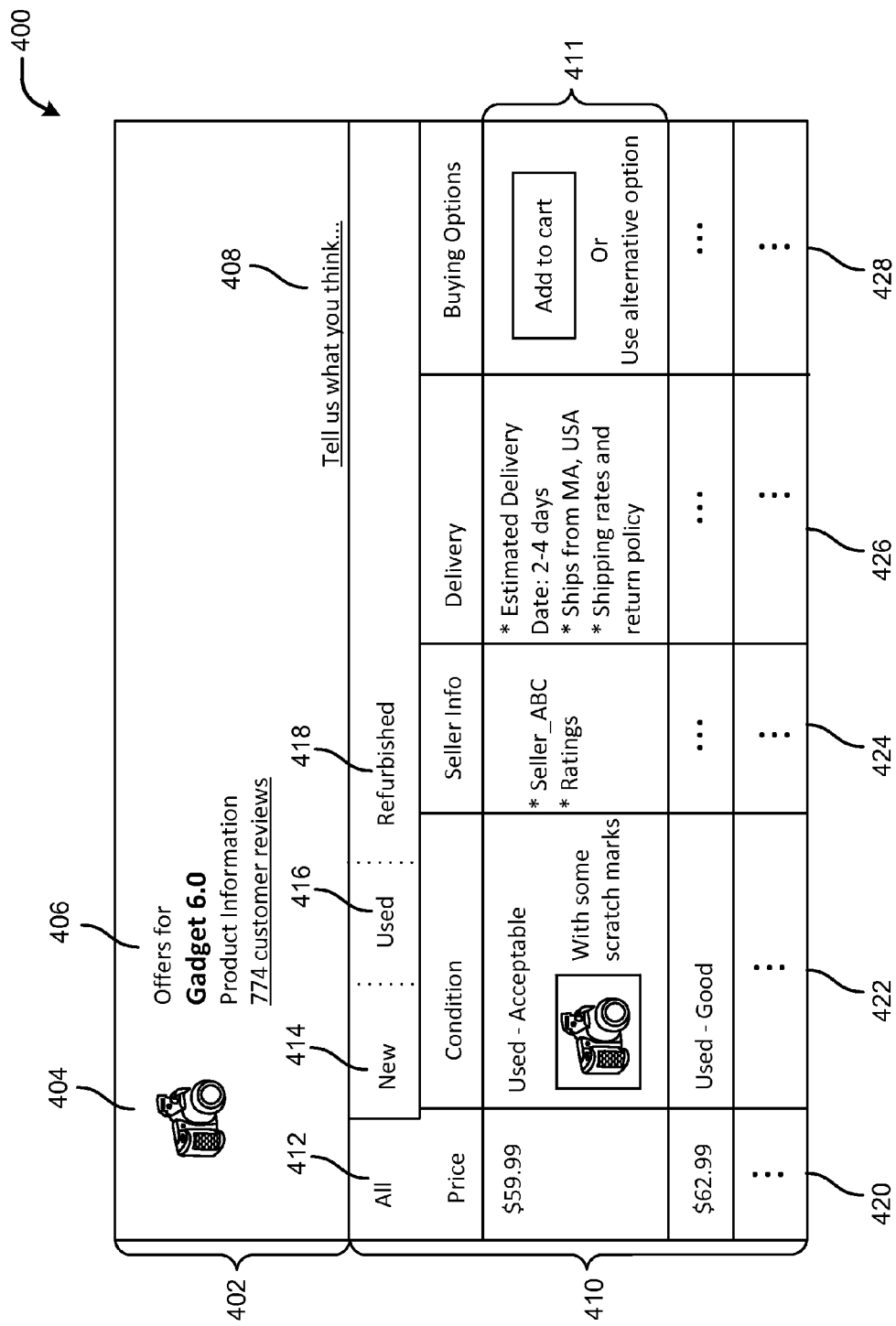
FIG. 4 illustrates an exemplary offer listings user interface, in accordance with embodiments.
Figure 5:
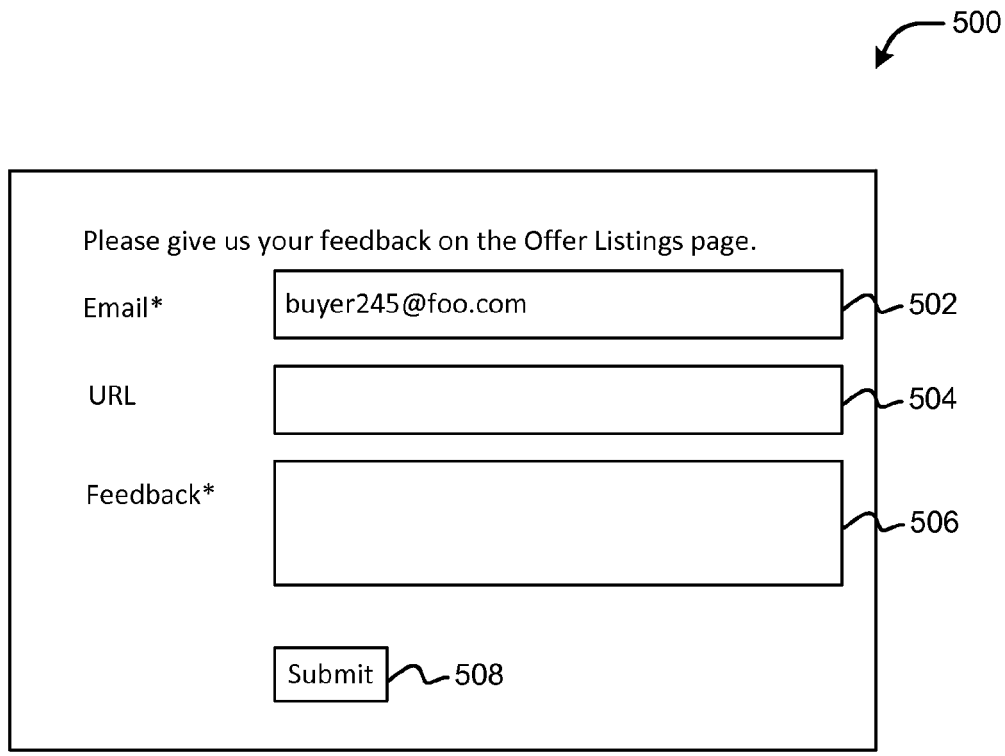
FIG. 5 illustrates an exemplary feedback user interface, in accordance with embodiments.

The offer management system 300 can be configured to provide an offer listings user interface (UI) 308 that is configured to present offers of items to and to receive feedback from one or more customers devices 302. An exemplary offer listings UI is shown in FIG. 4. In some cases, the feedback may be provided from feedback UI. An exemplary feedback UI is shown in FIG. 5. The feedback UI may be is accessible from or otherwise integral to the offer listings UI. Alternatively, the feedback UI may be distinct and separate from the offer listings UI. In various embodiments, the offer listings UI and any other user interfaces discussed herein can include or be part of an application programming interface ("API") that enables a user or a process to programmatically interface with the various features, components and capabilities of the offer management system. Such APIs may include graphical user interfaces (GUIs), Web-based interfaces or services, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. Although GUIs are used throughout as example user interfaces for clarity, any suitable user interface may be used in accordance with embodiments including APIs.

The offer management system 300 can include a feedback data store 312 configured to store feedback such as user-provided feedback received from received from customer devices 302 via the offer listings UI 308. The feedback data store 312 can also be configured to store data related to feedback such as context information associated with the user-provided feedback that may be extracted from or derived based on the user-provided feedback. For instance, context information associated with feedback may include information about a contributor of the feedback (e.g., user identifier, user name, email address, mailing address, phone number). Context information can also include information about one or more objects or entities involved in or associated with the feedback such as one or more items, item attributes, sellers, buyers, offers, offer attributes, marketplace features, network documents, and the like.

The offer management system 300 can include a rules recommendation engine 314 that is configured to process user-provided feedback to generate recommended rules. An exemplary process that may be implemented by the rules recommendation engine 314 for generating recommended rules is discussed in FIG. 8. The rules recommendation engine 314 may be operably connected to the feedback data store 312 and may be configured to retrieve feedback related data from the feedback data store 312. The feedback related data may be analyzed or processed in conjunction with data from other sources to facilitate the generation of recommended rules. For instance, the rules recommendation engine 314 may be configured to retrieve and/or store data from a corpora data store 318 that is configured to store collection or collections of corpora data that can be used to facilitate textual analysis of the feedback data and/or generation of the recommended rules, for example, by natural language processing and/or machine learning algorithms. Corpora data can include domain-specific information or knowledge associated with a specific domain. Domain-specific information may be relevant only to entities within that specific domain or category. Domain-specific information can include textual corpora for specific domains, domain ontologies, and/or domain-specific information for categories of objects within a given electronic market (e.g., items, item attributes, offers, offer attributes, and the like). For example, the domain-specific information may indicate that a price is relevant to an item but not relevant to a seller. As another example, the domain-specific information may indicate that certain attributes are applicable for books (e.g., ISBN) but not for electronics. Rules may be filtered based at least in part on such domain-specific information. For example, a rule that is based on the ISBN of an electronic gadget may be filtered as invalid. The rules recommendation engine 314 may optionally interact with an actions data store 320 configured to store rule actions that may be associated with rule conditions of the recommended rules. The rule actions stored in the actions data store 320 may be pre-defined and/or generated by a machine learning algorithm. The rules generated by the rules recommendation engine 314 may be stored in the rules data store 316. The recommended rules and final rules may be stored in the same data store such as illustrated here or they may be stored in different data stores.

Figure 6:
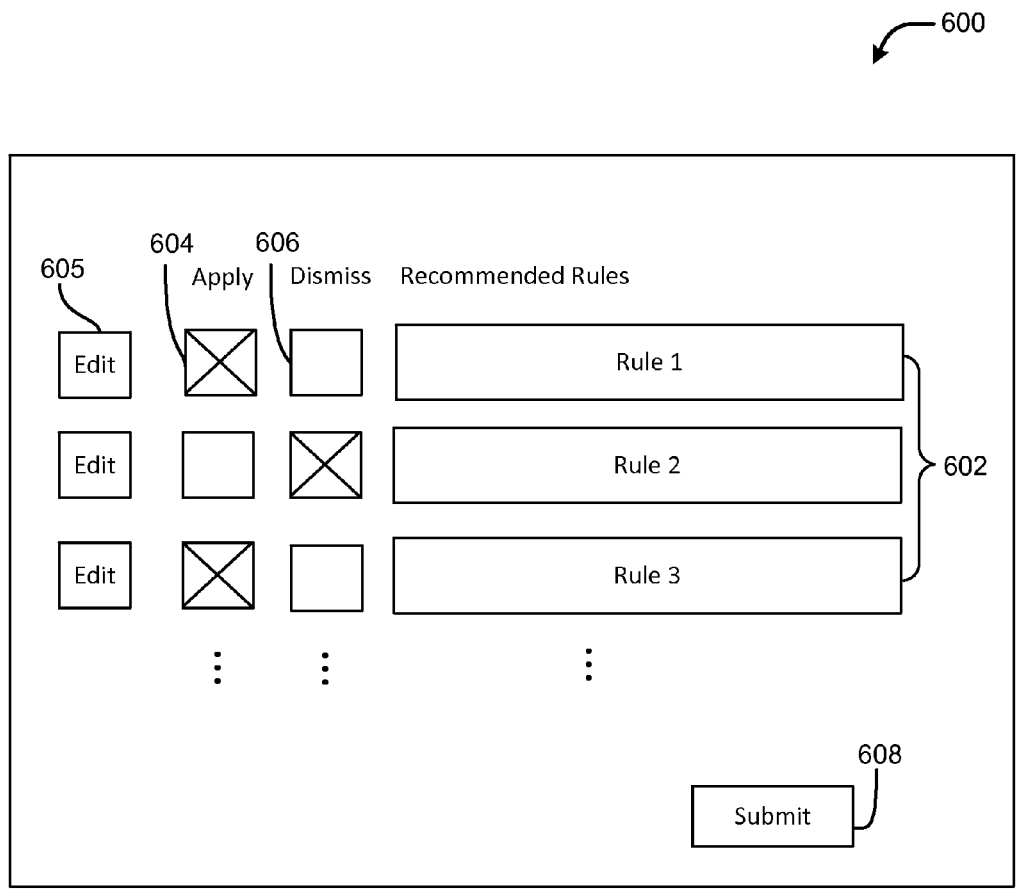
FIG. 6 illustrates an exemplary rules selection user interface, in accordance with embodiments.

The offer management system 300 can include a rules generation engine 322 that is configured to generate final rules based on the recommended rules generated by the rules recommendation engine 314. An exemplary process that may be implemented by the rules generation engine 322 for generating final rules is discussed in FIG. 9. The rules generation engine 322 may be configured to obtain the recommended rules directly from the rules recommendation engine 314 and/or from the rules data store 316. The rules generation engine 322 may be configured to support a rules selection UI 324. The rules selection UI 324 may be configured to present recommended rules to system administrator devices 306 operated by system administrators (e.g., rule authors). In some cases, the recommended rules may be ranked, sorted, or otherwise processed before being presented to the rules selection UI 324. An exemplary rules selection UI is shown in FIG. 6. A system administrator can interact with the rules section UI to accept or reject the presented recommended rules. In accordance with some embodiments, an administrator may also be allowed to modify and/or combine presented recommended rules so as to create final rules. For instance, the administrator may use the rules selection UI 324 to modify the rule condition portion and/or the rule action portion of an existing recommended rule so as to make a new final rule. As another example, the administrator may use the rules selection UI 324 to combine two more recommended rules to make a new final rule. User instructions received from the rules selection UI 324 can be passed to the rules generation engine 322 to guide the generation of final rules accordingly.

In accordance with some embodiments, pre-validation of the recommended rules may be performed by the rules generation engine 322 to filter out invalid recommended rules before presenting the pre-validated recommended rules to the rules selection UI 324. Alternatively or additionally, in accordance with some embodiments, post-validation of final rules may be performed by the rules generation engine 322 after user instructions have been received. Such post-validation may be performed on recommended rules accepted or selected by the system administrator and/or new final rules created by the system administrators via the rules selection UI 324.

In accordance with some embodiments, the rules generation engine 322 may be configured to interface with an automated rules selection process instead of or in addition to the rules selection UI. The automated rules selection process may accept or reject recommended rules (e.g., using machine learning techniques) and provides the results back to the rules generation engine 322. Such an automated rules selection process may be used to validate the rules in conjunction with the manual validation via the rules selection UI 324. Alternatively, the automated rules selection process may be used to validate the rules instead of the manual validation via the rules selection UI 324.

In accordance with some embodiments, validation of the recommended rules (e.g., including user validation via the rules selection UI and/or automated pre-validation and post-validation by the rules generation engine) may be used to train the rules recommendation engine 314, the automated rules selection process, or any other trainable processes so as to improve the underlying processes, for example, under supervised, semi-supervised, and/or reinforcement machine learning models. The training may be domain specific. For instance, rules that have been determined to be invalid or that has not been applied for one domain (e.g., item, category, seller) may be disfavored and never generated again by the rules recommendation engine for the specific domain. The same rule may be still be generated, however, for other domains. For example, when a price filter rule for books is invalidated, the recommended rules engine may be trained so as to not generate the same rule again for books. However, the same price filter rule may be still be generated for electronics and presented for selection (e.g., by an administrator or an automated process). In some other embodiments, the training may not be domain specific. A rule that is invalidated or that has been invalidated may be disfavored across generally across more than one domain.

In accordance with some embodiments, entities other than the administrator devices 306 may also be allowed to provide input from stakeholders into the generation of final rules. For instance, aspects of the rules selection UI 324 may be accessible to seller devices 304 to allow sellers to accept and/or reject recommended rules and/or to suggest final rules.

The offer management system 300 can include a rules application engine 326 that is configured to apply final rules to offer listings. The rules application engine 326 may be configured to obtain the final rules directly from the rules generation engine 322 and/or from the rules data store 316. In some embodiments, the rules generation engine 322 and/or from the rules data store 316 may be configured to perform rules de-duplication discussed herein. The final rules may be applied to the offers stored at an offers data store 328.

The rules application engine 326 may be configured to trigger a variety of predetermined rule actions associated with applicable final rules. For instance, a rule action may include updating an offer or offer attribute. Updating an offer may include showing or hiding the offer from a list of offer listings and/or updating one or more of the offer attributes. Updating an offer attribute can include showing or hiding the attribute, or updating a value of the attribute. The user interface that is being updated may be buyer-facing (e.g., the offer listings UI 308), seller-facing (e.g., the offer provider UI 310), or both. In some embodiments, the user interface may be configured to present information to users other than a seller or a buyer.

In accordance with some embodiments, some recommended rules may be selected automatically for application. Such automatic rule selection may be based on the type and/or complexity of the rules. For instance, rules involving UI updates may be automatically selected for application without human intervention whereas price filter rules may require human validation. A relatively simple rule with a relatively simple rule condition and/or rule action may be applied automatically whereas a relatively complex rule with a relatively complex rule condition and/or rule action may require human intervention. The automatic rule selection may be based on historical performance of the rules. For example, a rule that has been previously selected and applied may be applied automatically in the future. In accordance with some embodiments, automatic application of rules may be combined with post-application check by a human user (e.g., administrator) to mitigate potential errors. Such post-application check may be performed via the rules selection UI 324 or via some other user interface.

Aspects of the application of the rules by the rules application engine 326 may be used to train the rules recommendation engine 314, the automated rules selection process, or any other trainable processes so as to improve the underlying processes, for example, under supervised, semi-supervised, and/or reinforcement machine learning models. The aspects of rules application may include application priority (e.g., which rules are applied first), application schedule (e.g., when the rules are applied and/or how frequent the rules are applied), and other patterns associated with the application of the rules. For instance, among the ten final rules generated by the rules generation engine, three rules may be applied at a higher priority or frequency than the remaining seven rules. Such aspects of rules application can be used to train the rules recommendation engine 314, for example, to favor or put more weight on the three rules relative to the other seven rules. The aspects of rules application may also include results of the application of rules. The results can be measured in statistics associated with application of the rules such as a number of sellers, offers, or attributes affected by one or more rules or a frequency at which rules are found to be applicable. For example, if an application of a first rule affected 100 offer listings whereas an application of a second rule only affected five offer listings, such a result may be used to train the rules recommendation engine 314 to favor the first rule more than the second rule. The results of rules application can be measured by other post-application metrics. For example, the result of applying a rule can be measured by the number and/or content of user feedback received after the application of the rule. If the total number of user feedback decreases and/or if the number of positive user feedback increases, then the rule may be considered effective and the recommendation engine may be trained to favor the rule. As another example, if the overall revenue increases after the application of a set of rules, the set of rules may be favored relative to other rules that cause no or less revenue increase.

The offer management system 300 can be optionally configured to provide an offer providers user interface (UI) 310 that is configured to receive offers of items from one or more seller devices 304. Offer related data (e.g., including offer attributes discussed herein) may be stored in the offers data store 328 that is operable connected to the offer providers UI 310. The offer provider UI may also be configured to provide notification to sellers regarding their offers as a result of suitable application of rules. The rules may be generated based on user feedback such as discussed herein. In accordance with some embodiments, the offer provider UI 310 and/or the offers data store 328 may not be part of the offer management system 300 but may be accessible to components of the offer management system 300.

FIG. 4 illustrates an exemplary offer listings user interface 400, in accordance with embodiments. The offer listings user interface 400 may be configured to allow a user to provide feedback with respect to any aspect of the offer listings user interface 400, for example, via feedback link 408. In response to selection of the feedback link 408, feedback user interface such shown in FIG. 5 may show up in a popup window or in a new page. In various embodiments, feedback links may be associated with the entire offer listing page or any suitable portion thereof such as the item, an individual offer or a set of offers, an individual offer attribute (e.g., condition, seller rating) or a set of offer attributes, and the like.

The offer listings user interface 400 may be configured to present a plurality of offers to sell for an item from one or more sellers. The offer listings user interface 400 can include an item information section 402 configured to present information about the item for sale such as an image 404 of the item, and other item information 406 such as item name, customer reviews, and/or a link to more detailed item information. The offer listings user interface 400 can also include an offers section 410 configured to present offers for the item from sellers. The offers in the offers section 410 can be presented according to one or more offer attributes. For instance, the offers may be displayed according to the conditions of offers such that new offers are displayed in the new offers section 414, used offers are displayed in the used section 416, refurbished offers are displayed in the refurbished section 418 and all offer are displayed in the all offers section 412. Each offer 411 may be displayed as an entry or row in an offer listings table. The offer listings table may have columns containing offer attributes. For instance, the price column 420 may be configured to present pricing information of the respective offer and may optionally include tax and/or shipping charges. The condition column 422 may be configured to present condition information of the respective offer such as New, Refurbished, Used—Acceptable, Used—Good, Used—Very Good, and the like. Additional condition information may be provided including an image or video of the offered item or a seller-provided description of the offered item. The seller information column 424 may be configured to present seller information of the respective offer such as seller name, launch status (e.g., "Just Launched"), ratings and/or reviews of the seller, and the like. The delivery column 426 may be configured to present delivery information of the respective offer such as estimated delivery date or date range, ship from address, domestic shipping rates and return policy, and the like. The buying options column 428 may be configured to present one or more options for a user to start add the respective offer to an electronic shopping cart and/or to purchase the offered item.

FIG. 5 illustrates an exemplary feedback user interface 500, in accordance with embodiments. In accordance with some embodiments, the feedback user interface 500 may be accessible from the offer listings user interface via a link or other control such as discussed above in FIG. 4. In other embodiments, the feedback user interface 500 may be distinct and separate from the offer listings user interface. The feedback user interface 500 may include a plurality of input user interface controls or fields for a user to enter or select data related to the feedback. The user interface fields can include text fields, text boxes, dropdown list, checkboxes and the like. Information collected by the feedback user interface can include feedback content (e.g., text, voice recording, images, videos), contributor information (e.g., email address, user identifier, user name), link information for offer listings, items, sellers, buyers, or any other objects involved in the feedback, and the like. As illustrated, the feedback user interface 500 includes an email field 502 for entering a user's email address, a URL field 504 for entering a URL associated with the feedback, and feedback field 506 for entering feedback text. In various embodiments, more or less input fields than illustrated may be provided. In accordance with some embodiments, some or all of the fields may be auto-populated by default. For instance, the email field 502 may be auto-populated with the current user's email address, if available, or left blank if no user is logged in. The URL field 504 may be auto-populated with the URL for the offer listing page for which the feedback is given. Alternatively, the URL field 504 may be blank by default. In some cases, the auto-populated input fields may be further editable by the user. Some or all of the feedback fields may be required. The feedback user interface 500 can also include a submit control 508 for a user to submit a completed feedback.

FIG. 6 illustrates an exemplary rules selection user interface 600, in accordance with embodiments. In accordance with some embodiments, the rules selection user interface 600 may be configured to permit system administrators to accept and/or reject recommended rules. The rules selection user interface 600 can be configured to display a plurality of recommended rules 602. Each of the presented recommended rules 602 may be associated with one or more selection indicators. The administrator may select a submit control 608 to submit to selections. As illustrated, each recommended rule is associated with an apply control 604 (e.g., a checkbox), a dismiss control 606 (e.g., a checkbox), and a edit control 605. The apply control 604 may be selected to indicate that the respective recommended rule should be accepted and/or applied as a basis for a final rule. The dismiss control 606 may be selected to indicate that the respective recommended rule should be dismissed and not used as a basis for a final rule. The edit control 605 may be used to edit the respective recommended rule. Selection of the edit control 605 may render the respective recommended rule editable. In other embodiments, the edit control may be optional and the rules may be editable by default. For example, as illustrated, Rule 1 and Rule 3 are accepted and Rule 2 is dismissed. In another embodiment, instead of two selection controls per rule, only one selection control may be used per rule to indicate acceptance or dismissal of a respective recommended rule. For instance, a single checkbox may be associated with each recommended rule, selection of which indicating acceptance and unselection of which indicating dismissal. In yet another embodiment, the recommended rules themselves may be selectable or unselectable to indicate acceptance or dismissal. callow a user to create final rules by modifying presented recommendation rules (e.g., using the edit control 605) such as by modifying the rule condition and/or the rule action portion of a recommended rule, associating a rule action with a recommended rule that doesn't have a rule action, combining aspects of two or more recommended rules, creating brand new rules, copying recommended and/or final rules, updating recommended and/or final rules, removing recommended and/or final rules, and the like.

According to some embodiments, a user interface may be provided for a user (e.g., an administrator) to undo at least some aspects of the rules selection, generation, and/or application process. For instance, the rules selection interface discussed above or a separate user interface may be provided to enable an administrator to undo at least some aspects of the rule selections and/or application after the rules selections have been submitted. For examples, rules that been submitted as valid but not yet applied may be unselected (e.g., for dismissal). As another example, rules that have been selected as valid and actually applied may be prevented from being applied to more offers. As yet another example, effects of the applied rules may be rolled back where possible to undo the application of the rules. For instance, offers that have been removed or hidden from an offer listings user interface due to the application of a price filter rule may be rendered visible again.

Figure 7:
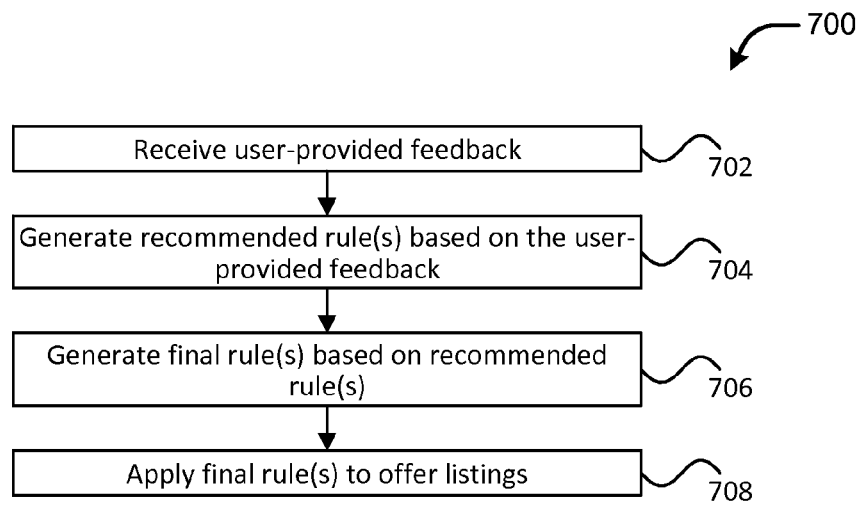
FIG. 7 illustrates an exemplary process for managing offer listings based on user-provided feedback, in accordance with embodiments.

FIG. 7 illustrates an exemplary process 700 for managing offer listings based on user-provided feedback, in accordance with embodiments. Aspects of the process 700 may be performed, in accordance with some embodiments, by components of the offer listings management system or service such as discussed in connection with FIGS. 1-3. Some or all aspects of the process 700 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 700 can include receiving 702 a user-provided feedback. The feedback can be provided by a user (e.g., buyer or seller) received from an offer listings user interface or feedback user interface (which may or may not be accessible from the offer listings user interface) such as described herein. The offer listings user interface can be configured to present a plurality of offers for an item from one or more sellers. Each offer may be associated with a plurality of offer attributes such as price, seller information, and condition. The feedback may be regarding at least one of the plurality of offers or an offer attribute thereof. In accordance with some embodiments, the feedback may be regarding an item, an item attribute, a set of item attributes, a set of offers, a set of offer attributes, and the like. The feedback may comprise a plurality of feedback attributes such as feedback text, a user identifier (e.g., email address), and a reference to the offer associated with the feedback (e.g., a URL). In accordance with some embodiments, context information associated with the feedback can be extracted from or derived based on the feedback. For example, the URL link may provide context information about the item, an item attribute, a seller, a buyer, an offer, or an offer attribute associated with the feedback.

Based at least in part on the user-provided feedback, one or more recommended rules can be generated 704. In accordance with some embodiments, the feedback text may be analyzed to extract relevant entities and entity relations. The extracted entity relations may be used to generate recommended rules. Any suitable data mining, statistical analysis, natural language processing, and/or machine learning techniques may be used. Some or all aspects of the step 704 may be based at least in part on the feedback context information and/or domain-specific information associated with the entities. An exemplary process for generating recommended rules based on feedback is further discussed in FIG. 8.

Based at least in part on the one or more final rules, one or more final rules can be generated 706. The recommended rules can be presented at a rules selection user interface configured to enable a reviewer such as a rule author to apply (accept) or discard the recommended rules. Accepted recommended rules can be deem valid and used to generate final rules. Discarded rules can be deemed invalid and not used to generate final rules. The acceptance and rejection, or validation, of recommended rules can be fed as training data to the rules recommendation engine so as to affect the generation of future recommendation rules. Validation of the recommended rules can be performed by human users, as discussed above, by an automated process, or by a combination of both. For instance, automated validation of the recommended rules can be performed before and/or after the human validation of the recommended rules. In some cases, the accepted recommended rules can be used directly as final rules. In other cases, the accepted recommended rules can be further modified, combined, or otherwise processed to generate the final rules. For instance, a recommended rule can be augmented with a rule action. As another example, a relatively weak recommended rule (e.g., with missing rule condition elements) can be made stronger (e.g., with the missing rule condition elements populated).

In accordance with some embodiments, some recommended rules may be selected automatically for application as final rules. Such automatic rule selection may be based on the type and/or complexity of the rules. For instance, rules involving UI updates may be automatically selected for application without human intervention whereas price filter rules may require human validation. A relatively simple rule with a relatively simple rule condition and/or rule action may be applied automatically whereas a relatively complex rule with a relatively complex rule condition and/or rule action may require human intervention. The automatic rule selection may be based on historical performance of the rules. For example, a rule that has been previously selected and applied may be applied automatically in the future. In accordance with some embodiments, automatic application of rules may be combined with post-application check by a human user (e.g., administrator) to mitigate potential errors. An exemplary process for generating recommended rules based on feedback is further discussed in FIG. 8.

The generated final rules can be applied 708 to the offers. Applying a final rule to a plurality of offers can include, for each individual offer of the plurality of offers, determining whether the rule condition of the final rule is satisfied by the offer attributes of the given offer. In response to determining that the rule condition is satisfied, an associated rule action can be triggered. The rule action may be part of the final rule. Alternatively, the rule action may be dynamically associated with the rule condition when the rule is applied. In accordance with some embodiments, a rule may be associated with multiple actions, some or all of which are triggered when the rule condition is satisfied. For instance, when an offer's price is outside the range allowed by a price filter rule, the offer may be removed from the offer listings and the seller may be notified via a notification. The rule actions associated with a given rule may be triggered at a predetermined order or at about the same time. Alternatively, the rule actions may be triggered at a random order.

As discussed above, a rule may be selectively applied to objects within a specific rule context or domain. A rule context can include, for example, one or more items (e.g., as identified by their identifiers or ASINs), categories (e.g., electronics, books), sellers, and the like. For example, where a rule context specifies one or more item identifiers, the rule may only be applied to only offer listings associated with those one or more items identified by the item identifiers, and not to offer listings associated with other items. As another example, where a rule context specifies one or more categories, the rule may be applied to only offer listings associated with those one or more categories, and not to offer listings associated with other categories.

In a price filter example, a rule condition may compare the price of an offer with a threshold value and the rule condition is satisfied if the price of the offer exceeds the threshold value. The threshold value may have been extracted from a user-provided feedback used to generate a recommended rule that the final rule is based on. A rule action associated with the price filter may be to remove the offer from or render the offer invisible from an offer listing user interface.

In an example, rendering an offer invisible from the user interface can be implemented by removing or marking as removed the data corresponding to the offer from an offers data store. In another example, rendering the offer invisible can be implemented by updating an offer attribute in the offer (e.g., a suppression flag). The offer attribute of the offer can be checked when the user interface is rendered to determine whether to render the offer. For instance, if the offer attribute has a value of "0," then the offer is rendered; whereas if the offer attribute has a value of "1," then the offer is not rendered. In situations where direct removal of merchant offers is prohibited or undesirable (e.g., due to rules or policies), the second approach may be preferred.

In a seller block example, a rule condition may compare the seller id of an offer with a predetermined seller id value and the rule condition is satisfied if the seller id of the offer is the same as the predetermined seller id value. The predetermined seller id value may have been extracted from a user-provided feedback used to generate a recommended rule that the final rule is based on. A rule action associated with the rule may be to block offers from the given seller (e.g., by adding the seller to a blacklist).

In a sender notification example, the rule condition of the final rule may compare the offer identifier with a given identifier value extracted from a user-provided feedback. When the offer identifier is the same as the given identifier value, then the rule condition is satisfied and the associated rule action is triggered to provide notification to the seller associated with the offer. The notification may include a portion of the original user-provided feedback (e.g., to negotiate a better price, to report a problem with an order). In some cases, the notifications can include a warning message generated by the electronic marketplace (e.g., about a seller's lowball offer). In accordance with some embodiments, instead of or in addition to sending notification to a seller, notification may be provided to buyers or other entities using the system described herein. Seller notifications can be achieved via any suitable channels such as email, fax, text message, phone call, or UI update (discussed below). In some embodiments, the notifications can be provided to buyers in a similar manner as for seller notifications.

In a UI update example, the rule condition of the final rule may compare the offer identifier with a given identifier value extracted from a user-provided feedback. When the offer identifier is the same as the given identifier value, then the rule condition is satisfied and the associated rule action is triggered to update one or more attributes of the offer (e.g., seller rating or reputation, reliability indicator) such that the updated attribute value is displayed in the user interface. In accordance with some embodiments, UI attributes may be added and/or updated instead of or in addition to updating offer attributes. The UI updates can function as notification to sellers or buyers.

As an example, a user may submit feedback about an offer attribute (e.g., poor quality of an image associated with an offer). An exemplary rule that is generated based on the feedback may include updating the offer attribute such as hiding the image from the user interface. Additionally, the seller may be notified of the poor quality of the image (e.g., in a seller-facing user interface or via email).

As another example, one or more users may submit feedback complaining about an offer as a whole (e.g., fraudulent or otherwise undesirable offer). A rule that is generated based on the feedback(s) may include removing the offer from the UI or marking the offer(s) as potentially fake, unreliable, or otherwise undesirable with a visual indicator. Additionally, the seller may also be notified in a seller user interface (e.g., offer provider user interface 310 of FIG. 3) or via other means (e.g., email, text message, phone call, fax).

Other exemplary rule actions are also considered with the scope of the present disclosure including internal bookkeeping (e.g., generation and/or update of log files), updating access rights associated with users (e.g., buyers or sellers), authentication or security update (e.g., credential verification or requiring a higher level of authentication for a particular user or group of users), solicitation of information from users (e.g., surveys, requests for clarification or comments), solicitation of actions from users (e.g., to remove an illicit offer), customized or targeted content push (e.g., targeted advertisement), and the like.

As discussed above, aspects of the application of the rules may be used to train the rules recommendation engine, the automated rules selection process, or any other trainable processes so as to improve the underlying processes, for example, under supervised, semi-supervised, and/or reinforcement machine learning models. Such aspects can include, for example, the priority, frequency, and results of the application of rules.

Figure 8:
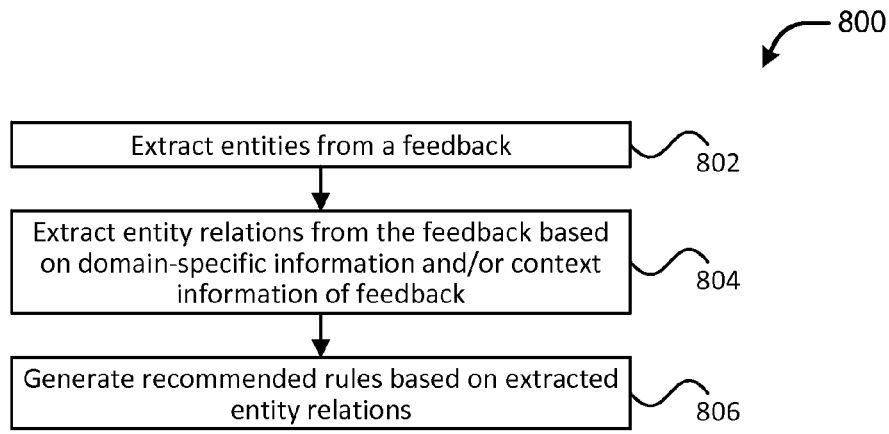
FIG. 8 illustrates an exemplary process for generating recommended rules based on user-provided feedback, in accordance with embodiments.

FIG. 8 illustrates an exemplary process 800 for generating recommended rules based on user-provided feedback, in accordance with embodiments. Aspects of the process 800 may be performed, in accordance with some embodiments, by components of the offer listings management system or service such as discussed in connection with FIGS. 1-3. In an embodiment, the process 800 may be implemented by the rules recommendation engine discussed in FIGS. 1-3.

In accordance with some embodiments, a natural language processing (NLP) model and/or a machine learning model may implemented by the process 800. Process 800 can include extracting 802 entities from feedback based on textual analysis of the feedback text. The feedback may be a user-provided feedback regarding an offer listing. Given feedback text, entities in the text can be identified or recognized and classified into predefined categories such as names of persons, names of objects, organizations, locations, expressions of times, quantities, monetary values, and the like. In various embodiments, any suitable Name-entity Recognition (NER) or information extraction techniques may be used. For instance, given the following feedback text:

The book "There a Civil Engineer Inside of You" is listed at $2000 each. Is this a misprint of the price?

The following entities may be recognized and extracted:
NN (Civil Engineer)
NN (Book)
VB (misprint)
NN (2000$)

where NN means common noun, and VB means verb in base form.

Next, entity relations among the entities may be detected and extracted 804 from the feedback. Any suitable relationship extraction techniques such as used in the context of natural language processing may be used. Using the above feedback as an example, example entity relations that are extracted can include, but not limited to:

Civil Engineer=>2000
Book=>2000
Misprint=>Civil Engineer
Misprint=>Book
Misprint=>2000

Relevant entity relations can be extracted based on domain-specific information respectively associated with the entities such as domain ontologies. Domain-specific information can include domain ontologies and/or textual corpora associated with specific domains. In the example above, the entity relations "Book=>2000" and "Misprint=>Book" more relevant given the domain knowledge specific to books than the entity relations "Civil Engineer=>2000" and "Misprint=>Civil Engineer". Additionally or alternatively, extracted relations may be filtered by context information associated with the feedback. The context information may indicate, for example, the underlying object associated with the feedback (e.g., an item, an offer, or an attribute thereof). Such information may be used to filter out irrelevant relations such as a relation between a condition and a seller and to keep relevant relations such as a relation between a condition and an item. In accordance with some embodiments, extraction of relevant entity relations can be further based on supervised learning techniques (e.g., training the machine learning algorithm on set of rules). For example, validation of the recommended rules by rule authors can be used to train a natural language processing model using machine learning algorithms. Examples of more relevant entity relations, based on the above feedback, can include but not limited to:

Misprint=>Book
Misprint=>2000
Book=>2000
Misprint=>2000
Misprint=>Book=>2000
Book=>2000=>Civil Engineer Finally, one or more recommended rules can be generated 806 based at least in part on the extracted relevant entity relations. In particular, rule conditions of the recommended rules can be generated based on some or all of the extracted relevant entity relations. In an example, the extracted entity relations may be ranked according to relevancy and the most relevant entity relation or relations may be used to generate a recommended rule. In the example above, the following entity relation may appear most relevant and used to generate a recommended rule:

Misprint=>Book=>2000

The extracted relations may be used to generate the rule condition and/or the rule action portions of a rule. For instance, given the above entity relation, the rule condition of the recommended rule may be "category 'book' & price '2000'" and the rule action of the recommended rule may be a course of actions to take for a misprinted book such as notifying the seller about the misprint and/or providing a visual indicator on the offer listings user interface indicating a potentially misprinted price. When the recommended rule is provided to a rule author, selection or un-selection of the rule will provide feedback to train the natural language processing and/or machine learning model such that the model will eventually mature to an extent where it would need minimal rule correction and the quality of rule generation would improve.

Figure 9:
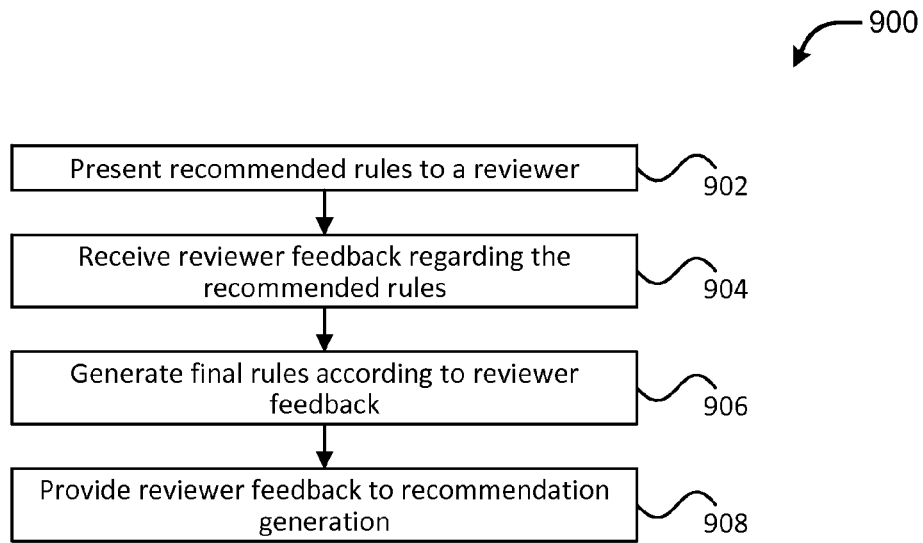
FIG. 9 illustrates an exemplary process for generating final rules based on recommended rules, in accordance with embodiments.

FIG. 9 illustrates an exemplary process 900 for generating final rules based on recommended rules, in accordance with embodiments. Aspects of the process 900 may be performed, in accordance with some embodiments, by components of the offer listings management system or service such as discussed in connection with FIGS. 1-3. In an embodiment, the process 900 may be implemented by the rules generation engine discussed in FIGS. 1-3.

The process 900 can include presenting 902 recommended rules to a reviewer. The reviewer can include a human user such as a system administrator tasked with generating rules (e.g., a rule author). The reviewer can also include an automated rules selection process. The automated rules selection process may be configured to select or validate recommended rules based on machine learning or other artificial intelligence techniques. The recommended rules may be presented at a rules selection interface. The rules selection interface can include a graphical user interface for a human user such as illustrated in FIG. 6 or an API for an automated rule selection process.

According to some embodiments, rules may be ranked and/or de-duplicated before they are presented such that only rules that have not been rejected and/or applied may be presented for selection. The rules may be ranked based on how and/or when they are applicable and/or applied. For instance, the rules may be ranked based on the rule context (e.g., items, categories, sellers) in which the rules are applicable or applied. A rule that is applicable in one context (e.g., books) may also be applicable in another category (e.g., electronics). As another example, the rules may be ranked based on the time the rules are applied or will be applied. Based on the ranked list, rules de-duplication may be performed to remove duplicate rules. For instance, duplicate rules applicable for the same domain and/or scheduled to be applied around the same period of time may be de-duplicated such that only one rule is applied. In some embodiments, the rules may be de-duplicated, presented, selected, and/or applied for specific applicable contexts or domains. For instance, a first set of rules may be presented as applicable to a first domain (e.g., books) whereas a second set of rules may be presented as applicable to a second domain (e.g., electronics). A rule that has been removed from the first set of rules (e.g., because it has been rejected or applied) may nonetheless appear in the second set of rules for the second domain.

Reviewer feedback with respect to the presented recommended rules can be received 904, for example, from a rules selection interface. The reviewer feedback can include reviewer instructions as to which recommended rules have been accepted by the reviewer and which recommended rules have been rejected by the reviewer. In accordance with some embodiments, human validation of the recommended rules (e.g., by a rule author) may be performed in conjunction with machine validation (e.g., by an automated rules selection process). For example, machine validation may occur before, during, and/or after the human validation. In an example implementation, a machine validation process may apply the rule to a set of offers to determine whether the rule is applicable to at least one of the set of offers and hence valid. In the case of an offer filter rule (e.g., a rule configured to filter out offers), a decrease in the offer count of the set of offers can indicate that the recommended rule is valid. On the other hand, if the offer count remains the same after application of the rule, then the recommended rule is not applicable to any of the offers and hence may be determined to be invalid.

Once a reviewer feedback is received, final rules may be generated 906 according to the reviewer feedback. For instance, final rules may be generated based on the recommended rules that have been indicated as valid by the reviewer feedback. Likewise, recommendation rules that have been indicated as invalid by the reviewer feedback may not be used to generate the final rules. As discussed above, a final rule can be generated based on one or more recommended rules that may or may not be modified or otherwise combined (e.g., by the rule author). The generated final rules may or may not replace existing rules that are being enforced. In some cases, recommended rules may be combined with existing rules to generate new or updated final rules.

In accordance with some embodiments, some recommended rules may be selected automatically for application as final rules. Such automatic rule selection may be based on the type and/or complexity of the rules. For instance, rules involving UI updates may be automatically selected for application without human intervention whereas price filter rules may require human validation. A relatively simple rule with a relatively simple rule condition and/or rule action may be applied automatically whereas a relatively complex rule with a relatively complex rule condition and/or rule action may require human intervention. The automatic rule selection may be based on historical performance of the rules. For example, a rule that has been previously selected and applied may be applied automatically in the future. In accordance with some embodiments, automatic application of rules may be combined with post-application check by a human user (e.g., administrator) to mitigate potential errors.

The reviewer feedback with respect to the recommended rules may be provided 908 to train recommendation generation (e.g., a rules recommendation engine) so as to improve the relevancy of the recommended rules. A recommended rule that has been accepted can be used to train the can be used as a positive feedback to train a recommendation engine to value the accepted rule such that similar rules may be generated in the future. As another example, when a recommended rule is rejected by a rule author, such result can be used as a negative feedback to train a recommendation engine to devalue the rejected rule such that less or no similar rules are generated in the future. In some cases, the reviewer feedback may be used to train the recommendation of rules specific to a particular seller, product, category of products, and the like.

Figure 10:
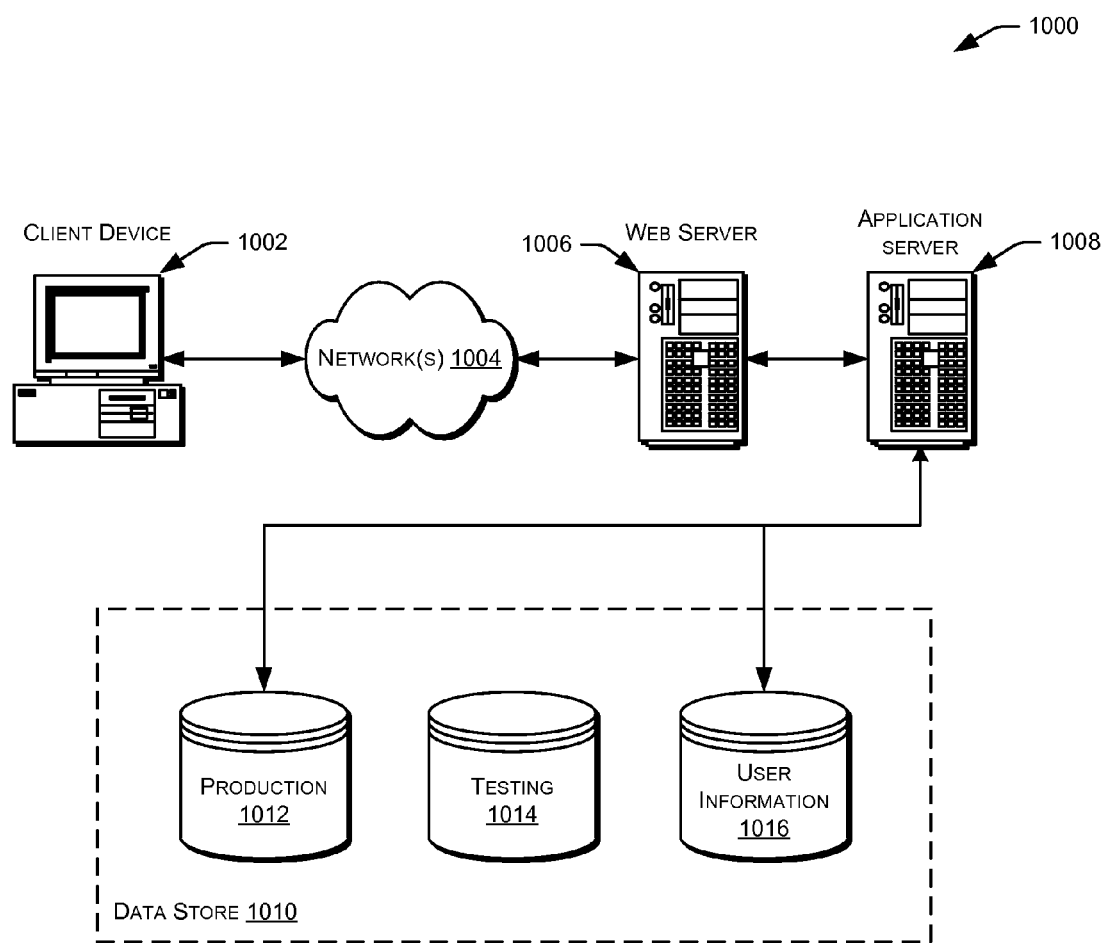
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    providing an offer listings user interface configured to present an offer for an item, wherein the offer includes a plurality of offer attributes including at least a price and a seller, the offer listing user interface including a user feedback interface for receiving feedback from a user;
    receiving, via the user feedback interface, user-provided feedback regarding the offer, the user-provided feedback comprising feedback text;
    extracting one or more entities from the user-provided feedback based at least in part on textual analysis of the feedback text;
    determining one or more entity relations with respect to the one or more entities based at least in part on domain-specific information associated with the one or more entities and context information associated with the feedback;
    generating, based at least in part on at least one of the one or more entity relations, a recommended rule comprising a rule condition and a rule action, the rule action comprising instructions to update an attribute of the offer;
    providing the recommended rule to the seller; and
    upon receiving an indication from the seller that the recommended rule should be applied, applying the recommended rule to the offer, by at least:
        determining whether the rule condition of the at least one recommended rule is satisfied by the offer attributes of the offer; and
        in response to determining that the rule condition is satisfied, executing the rule action with respect to the offer.

2. The computer-implemented method of claim 1, wherein the rule condition of the recommended rule is based on at least one offer attribute associated with the offer.

3. The computer-implemented method of claim 2, wherein the rule condition is satisfied when the price of the offer exceeds a threshold price extracted from the user-provided feedback.

4. The computer-implemented method of claim 2, wherein the rule condition is satisfied when the seller of the offer is the same as a seller extracted from the user-provided feedback.

5. A computer-implemented method, comprising:
    receiving user-provided feedback from an offer listings user interface configured to display a plurality of offers;
    extracting, from the user-provided feedback, one or more entities;
    determining one or more entity relations between the one or more entities based at least in part on context information associated with the user-provided feedback;
    generating a recommended rule based at least in part on the user-provided feedback, the recommended rule comprising a rule condition based at least in part on the one or more entity relations; and
    applying the recommended rule to at least one offer of the plurality of offers, comprising:
        determining whether the rule condition of the recommended rule is satisfied by the at least one offer listing; and
        in response to determining that the rule condition is satisfied, triggering a predetermined rule action associated with the rule condition of the recommended rule, the rule action causing one or more attributes of at least one offer of the plurality of offers to be updated.

6. The computer-implemented method of claim 5, wherein the user-provided feedback comprises a user identifier, a reference to an offer associated with the user-provided feedback, and feedback text.

7. The computer-implemented method of claim 5, wherein generating the recommended rule comprises:
    extracting a plurality of entities from the user-provided feedback based on at least in part on textual analysis of the feedback text;
    extracting one or more entity relations among the plurality of entities based at least in part on domain-specific information associated with the one or more entities and context information associated with the feedback; and
    generating the recommended rule based at least in part on the extracted one or more entity relations.

8. The computer-implemented method of claim 7, wherein the context information includes information about an item, an item attribute, a seller, a buyer, an offer, or an offer attribute associated with the feedback.

9. The computer-implemented method of claim 5, wherein the predetermined rule action comprises at least one of (1) removing the at least one offer from the plurality of offers; (2) sending a notification to a seller associated with the at least one offer; or (3) updating the offers listings user interface to display an updated offer attribute associated with the at least one offer.

10. The computer-implemented method of claim 9, wherein the updated offer attribute includes a condition indicator or a seller reputation indicator.

11. The computer-implemented method of claim 5, further comprising presenting the recommended rule for validation to a reviewer at a rules selection interface configured to enable a reviewer to apply or discard the recommended rule.

12. The computer-implemented method of claim 11, wherein the reviewer is a human user.

13. A computer system, comprising:
    a memory that stores computer-executable instructions; and
    a processor configured to access the memory and execute the computer-executable instructions to at least:

receive a user-provided feedback from an offer listings user interface configured to display a plurality of offers, the user-provided feedback associated with context information;

extract, from the user-provided feedback, one or more entities and one or more entity relations between the one or more entities based at least in part on the context information associated with the user-provided feedback;

generate one or more recommended rules based at least in part on the one or more entity relations, each individual recommendation rule of the one or more recommendation rules comprising a rule condition based at least in part on one or more entity relations of the one or more entity relations;

present the one or more recommended rules with a rules selection user interface; and generate a final rule based at least in part on one or more reviewer instructions received with the rules selection user interface.

14. The computer system of claim 13, wherein at least one of the one or more recommended rules is generated based at least in part on more than one user-provided feedback.

15. The computer system of claim 13, wherein the context information includes information about an item, an item attribute, a seller, a buyer, an offer, or an offer attribute associated with the respective user-provided feedback.

16. The computer system of claim 13, wherein the processor is configured to access the memory and execute the computer-executable instructions to further apply the final rule to the plurality of offers such that a predetermined action is triggered when the rule condition of the final rule is satisfied by at least one of the plurality of offers.

17. The computer system of claim 16, wherein the predetermined action includes sending a notification to a seller associated with the at least one offer.

18. The computer system of claim 16, wherein the predetermined action includes updating an offer attribute for the at least one offer.

19. The computer system of claim 16, wherein the predetermined action includes rendering the at least one offer invisible from the offer listings user interface.

20. The computer system of claim 13, generating the one or more recommended rules is further based on a previous reviewing instruction received from the rules selection user interface.

* * * * *